(12) United States Patent
Cooper

(10) Patent No.: US 10,066,664 B2
(45) Date of Patent: Sep. 4, 2018

(54) ROTATING PRESSURE CONTROL HEAD SYSTEM AND METHOD OF USE

(71) Applicant: Black Gold Rental Tools, Inc., Corpus Christi, TX (US)

(72) Inventor: James Richard Cooper, Odessa, TX (US)

( * ) Notice: Subject to any disclaimer, the term of this patent is extended or adjusted under 35 U.S.C. 154(b) by 215 days.

(21) Appl. No.: 14/829,610

(22) Filed: Aug. 18, 2015

(65) Prior Publication Data

US 2017/0051785 A1 Feb. 23, 2017

(51) Int. Cl.
| | |
|---|---|
| E21B 33/08 | (2006.01) |
| F16C 19/38 | (2006.01) |
| F16C 33/78 | (2006.01) |
| F16C 33/66 | (2006.01) |
| F16C 37/00 | (2006.01) |

(52) U.S. Cl.
CPC ............ *F16C 19/38* (2013.01); *E21B 33/085* (2013.01); *F16C 33/667* (2013.01); *F16C 33/7886* (2013.01); *F16C 37/007* (2013.01)

(58) Field of Classification Search
CPC ................. E21B 33/084; E21B 33/085; F16C 19/383–19/386; F16C 19/547; F16C 33/7886; F16C 33/7896; F16J 13/3204; F16J 13/3232; F16J 13/3268; F16J 15/3204; F16J 15/3232; F16J 15/3268
See application file for complete search history.

(56) References Cited

U.S. PATENT DOCUMENTS

| | | | |
|---|---|---|---|
| 3,400,938 A | 9/1968 | Williams | |
| 4,754,820 A * | 7/1988 | Watts | E21B 33/04 175/195 |
| 4,949,796 A | 8/1990 | Williams | |
| 5,251,869 A * | 10/1993 | Mason | E21B 33/085 251/1.1 |
| 5,662,181 A | 9/1997 | Williams et al. | |
| 6,470,975 B1 | 10/2002 | Bourgoyne et al. | |
| 7,380,590 B2 | 6/2008 | Hughes et al. | |
| 7,743,823 B2 | 6/2010 | Hughes et al. | |
| 7,926,593 B2 * | 4/2011 | Bailey | E21B 21/08 166/338 |
| 8,028,750 B2 | 10/2011 | Hughes et al. | |

(Continued)

OTHER PUBLICATIONS

Weatherford International, "Rotating Control Devices" screenshots from weatherford.com depicting various prior art RCD devices thought to be in existence prior to Aug. 18, 2014. 6 pages.

(Continued)

*Primary Examiner* — Frederick L Lagman

(57) ABSTRACT

Disclosed is a cooling and lubricating system (and method of use) for an RCD bearing/seal assembly comprising an internal conduit for directing fresh oil into the lower end of the bearing assembly where it can then progress upwardly through the bearing assembly and seals to provide cooling and lubrication to the internal bearings and rotary seals. The RCD system employs a small footprint oiler to deliver, via pressurized air, the oil to the RCD. Also disclosed is an RCD bearing assembly outfitted with the oil channel conduits for directing oil through the RCD bearing assembly to cool and lubricate the seals and bearings.

4 Claims, 9 Drawing Sheets

(56) References Cited

U.S. PATENT DOCUMENTS

| | | | |
|---|---|---|---|
| 8,096,711 B2* | 1/2012 | Beauchamp | E21B 33/085 277/345 |
| 8,500,337 B2* | 8/2013 | Beauchamp | E21B 33/085 277/345 |
| 8,991,484 B2 | 3/2015 | Riggs | |
| 2006/0144622 A1* | 7/2006 | Bailey | E21B 33/085 175/230 |
| 2009/0161997 A1* | 6/2009 | Beauchamp | E21B 33/085 384/15 |
| 2012/0125633 A1 | 5/2012 | Linde et al. | |
| 2012/0217022 A1* | 8/2012 | Michaud | E21B 33/08 166/378 |
| 2013/0032359 A1 | 2/2013 | Riggs | |
| 2016/0305213 A1* | 10/2016 | Godfrey | E21B 33/085 |

OTHER PUBLICATIONS

Weatherford International, "Model 7100 Rotating Control Device SafeShield® Series" brochure, thought to be in existence prior to Aug. 18, 2014. 3 pages.

Weatherford International, "Model IP 1100 Rotating Control Device SafeShield® Series" brochure, thought to be in existence prior to Aug. 18, 2014. 3 pages.

Weatherford International, "Model 7875 Docking-Station Rotating Control Device SeaShield® Marine Series" brochure, thought to be in existence prior to Aug. 18, 2014. 6 pages.

Weatherford International, "Model 7875 Below-Tension-Ring, Slim, Rotating Control Device" brochure, thought to be in existence prior to Aug. 18, 2014. 5 pages.

Weatherford International, "Model 7875 Below-Tension-Ring, Rotating Control Device" brochure, thought to be in existence prior to Aug. 18, 2014. 5 pages.

Weatherford International, "Model 7800 Rotating Control Device SafeShield® Series" brochure, thought to be in existence prior to Aug. 18, 2014. 4 pages.

Weatherford International, "Model 9000 Rotating Control Device SafeShield® Series" brochure, thought to be in existence prior to Aug. 18, 2014. 3 pages.

Weatherford International, "Model 7000 Rotating Control Device SafeShield® Series" brochure, thought to be in existence prior to Aug. 18, 2014. 4 pages.

M-I Swaco, A Schlumberger Company, "7068 Rotating Control Device" brochure, 2013, 2 pages.

M-I Swaco, A Schlumberger Company, "7068 Rotating Control Device System" web page screenshot 2014, www.slb.com, 1 page.

M-I Swaco, A Schlumberger Company, "8068/8068-G Rotating Control Device" brochure, 2013, 2 pages.

M-I Swaco, A Schlumberger Company, "8068/8068-G Rotating Control Device System" webpage screenshot 2014, www.slb.com, 1 page.

M-I Swaco, A Schlumberger Company, "DHS 1400 Rotating Control Device" brochure, 2013, 2 pages.

M-I Swaco, A Schlumberger Company, "8DHS 1400 Rotating Control Device System" webpage screenshot 2014, www.s1b.com, 1 page.

M-I Swaco, A Schlumberger Company, "Rotating Control Device 3 (RCD 3)" brochure, 2013, 2 pages.

M-I Swaco, A Schlumberger Company, "Rotating Control Device 3 (RCD 3) System" webpage screenshot 2014, www.slb.com, 1 page.

M-I Swaco, A Schlumberger Company, "Hold Rotating Control Device System" webpage screenshot 2014, 1 page.

M-I Swaco, A Schlumberger Company, "Case Study: Managed Pressure Drilling (MPD) System by @balance Services Enables Completion of Well with Narrow Operating Window in Woodford Shale, Oklahoma", webpage screenshot 2014, www.slb.com, 1 page.

M-I Swaco, A Schlumberger Company, "Case Study: Automated Managed Pressure Drilling (MPD) System by @balance Services: Operator Avoids Hazards While Drilling Narrow Pressure Window in Gulf of Mexico", 2014, www.slb.com, 3 pages.

M-I Swaco, A Schlumberger Company, "Performance Report: Operator Extends Development of Mature Deepwater GOM Field and Reduces Drilling Cost", 2012, www.slb.com, 3 pages.

M-I Swaco, A Schlumberger Company, "Performance Report: Deepest Managed Pressure Drilling (MPD) HPHT well drilled in Offshore Malaysia with @balance Services", 2014, www.slb.com, 1 page.

M-I Swaco, A Schlumberger Company, "Performance Report: Operator Eliminates Losses while Drilling with Casing and Cementing in Depleted Onshore Field", 2012, www.slb.com, 3 pages.

M-I Swaco, A Schlumberger Company, "Rotating Control Devices", webpage screenshots 2014, www.slb.com, 10 pages.

Halliburton Company, "Rotating Control Device 2000", webpage screenshots thought to be in existence prior to Aug. 18, 2014. 6 pages.

Weatherford-Williams, "Typical Installation of a Williams Model IP-1000 RotatingControl Head System" and Typical Installation of a Williams Model 7000 Rotating Diverter/Preventer System, thought to be in existence prior to Aug. 18, 2014. 4 pages.

* cited by examiner

ROTATING PRESSURE CONTROL HEAD SYSTEM AND METHOD OF USE

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

Field of the Invention

The present disclosure relates generally to the field of a drill through device with a rotating seal that contacts and seals against the drill string (drill pipe, casing, kelly, etc.) for the purpose of controlling the pressure or fluid flow to surface. These types of devices are generally referred to as a Rotating Control Devices ("RCD") or Rotating Pressure Control Head ("RPCH"). For example, an RCD system can be employed as a passive sealing system that offers improved safety in diverting well returns—such as pressurized gas, fluids, and cuttings—to a surface separation system during managed pressure drilling (MPD) or underbalanced drilling (UBD) applications. A primary purpose of an RCD is to create a secure seal around the rotating drillpipe and tool joint to positively divert annulus returns to thereby enhance health, safety, and environmental (HSE) performance during conventional drilling operations. Other RCD applications include, e.g., annular containment of wellbore fluids, managed pressure drilling (MPD), underbalanced drilling (UBD), pressurized mudcap drilling (PMCD), air, steam, foam drilling applications, diverting drilling fluids and cuttings to solids control equipment and handling gas influx and annular containment of wellbore fluid.

The RCD is flange connected directly on top of the blow out preventer (BOP) or on an adapter spool if required. The RCDs generally comprise three basic components: (1) a rotatable bearing assembly comprising heavy-duty roller bearings, (2) a flanged adapter bowl for receiving the bearing assembly, and (3) a clamp assembly for containing the bearing assembly within the flanged adapter bowl in a sealed, but rotatable fashion. The clamp assemblies are typically hydraulic, and may be manually or remotely controlled. RCDs can be modified to include a low-pressure protective riser (LPR) on top of the bearing housing as an additional or alternate means for isolating incidental spillage in an extended cover above the RCD rather than in a conventional drip pan.

RCD systems typically include hydraulic power units that supply oil to the RCD for purposes of lubricating and cooling the bearings and pressurizing the internal seals. RCDs also include use of a remote heat exchanger that circulates coolant through the RCD, as well as a remote oil pump that pumps oil into the RCD.

Exemplary RCD and RPCH devices are known in the art.

For example, Williams (U.S. Pat. No. 3,400,938) discloses a rotary drilling head assembly for a well bore, comprising a stationary housing and, a seal assembly supported by the stationary housing. The seal assembly comprises a rotatable sleeve member having a stationary sleeve member therearound, with. a chamber provided between the sleeves for receiving a lubricating fluid. Bearing means is interposed between the two sleeves and upper and lower sealing members are provided in order to preclude leakage of fluid from the chamber, and auxiliary seal means is provided for additional protection of the bearing means. In addition, quick opening and closing clamping means is provided for facilitating the installation of the assembly at the well site.

Williams (U.S. Pat. No. 4,949,796) discloses an improved drilling head which provides for the formation of a continuous seal about a drilling string, where the drilling string consists of varying diameter drill string components. A stationary bowl configured to pass a drill string is provided with an annular grove about the top so as to allow for the attachment of a connecting clamp. An assembly carrier is provided which is removably disposable within the bowl and to which a lower stripper rubber may be attached. A bearing assembly adapted for placement within the assembly carrier is provided with an upper rotatable stripper rubber of smaller diameter that the lower stripper rubber so as to form a seal on smaller diameter drilling strings.

Williams et al. U.S. Pat. No. 5,662,181) discloses a rotating blowout preventor having at least two rotating stripper rubber seals which provide a continuous seal about a kelly or drilling string having drilling string components of varying diameter. A stationary housing is designed to support a bearing assembly and a clamp cooperates with the housing to secure the bearing assembly in the housing. Chilled water and/or antifreeze may be circulated through the top inner barrel seal of the bearing assembly and lubricant is pumped into the top seal for lubricating the seals and bearings that facilitate rotation of the stripper rubber seals, kelly and drilling string with respect to the stationary housing and pressurize the inner barrel seals and bearings to at least partially offset well pressure.

Hughes et al. (U.S. Pat. No. 7,380,590 to Sunstone Technologies, LLC) discloses a Rotating Pressure Control Head (RPCH) with a rapid engagement mechanism. The RPCH comprises an upper body and a lower body. The rapid engagement mechanism allows the upper body to be quickly disengaged from the lower body and replaced with a new upper body. The upper body comprises a sealing element and an inner housing that rotates with respect to an outer housing. The sealing element contains a plurality of internal cavities. The plurality of cavities control the constriction of the sealing element around the drill pipe. Hughes et al. (U.S. Pat. Nos. 7,743,823 and 8,028,750 also to Sunstone Technologies, LLC) disclose a force balanced RPCD. The force balancing adjusts hydraulic fluid pressure in an upper piston area of an RPCD that has an inner housing rotatably engaged within an outer housing by an upper bearing and a lower bearing. The hydraulic fluid pressure is adjusted to balance net force in a upper piston area and a lower piston area. The fluid pressure adjustment creates a force differential that balances the total load transmitted through the upper bearing and the lower bearing and thereby extends the life of the sealing element and bearings. Additionally, a wear indicator signals the end of the useful life of the drill pipe sealing element.

Riggs (U.S. Pat. No. 8,991,484) discloses a rotating head having a bearing assembly removably seated in a bowl housing such that a top end of the bearing assembly sits flush with a top end of said bowl housing, the bowl housing having a tapered interior body, and the bearing assembly having a tapered exterior slightly smaller in diameter than, but conforming to the shape of the interior body of the bowl housing, the bearing assembly further comprising a stripper rubber, a bearing cap having an upper seal, a lower seal, bearings, and a snap ring holding the bearing assembly together and the bowl housing further having a dual hinge clamp assembly.

Linde et al. (U.S. Patent Application Publication No. 20120125633, Halliburton Energy Services, Inc.) discloses the remote operation of an RCD bearing clamp and safety latch. This application further discloses an RCD that can include a housing assembly which contains a bearing assembly and an annular seal which rotates and seals off an annulus between a tubular string and an RCD body, a remotely operable clamp device which selectively permits and prevents relative displacement between the housing assembly and the body, and a remotely operable safety latch which selectively permits and prevents unclamping of the clamp device. Linde et al. also disclose a method of remotely operating an RCD clamp device can include remotely operating a safety latch which selectively permits and prevents unclamping of the clamp device, and remotely operating the clamp device while the safety latch is in an unlatched position, thereby unclamping a bearing housing assembly from the RCD body. Another RCD can include a remotely operable clamp device which selectively permits access to an RCD body interior, and a remotely operable safety latch which selectively prevents unclamping of the clamp device.

Other exemplary RCD devices are available by MI SWACO (a Schlumberger company), such as the DHS 1400 RCD System, Hold RCD system, 7068 RCD system, 8086/8086-G RCD system; Halliburton Energy Services, such as the RCD 1000, RCD 2000 and RCD 5000 devices; and Weatherford International, such as models IP 1000, 70007100, 7875, 7800, and 9000.

The Weatherford RCD devices such as the IP-1000 and 7000 RCDs require the use of a remote heat exchanger that circulates coolant through the RCD, as well as a remote oil pump that pumps oil into the RCD.

The above exemplary RCD and RPCH devices are representative of those devices as are known in the art, and the above-referenced patent and patent publication references are incorporated herein by reference for all purposes.

With any RCD or RPCH device, it is important to provide lubrication of the bearing assembly and cooling of the bearing seals. However, the prior art devices currently provide cumbersome coolant circulation systems in addition to pumping oil into the RCD units. These systems require additional valuable rig space and rig up time.

Therefore, there remains a need for a simple, effective RCD bearing lubrication and seal cooling assembly and method.

BRIEF SUMMARY OF INVENTION

In one embodiment there is disclosed a rotating control device (RCD) comprising: a rotatable bearing assembly as described herein, a flanged adapter bowl assembly for receiving the bearing assembly, and, a clamp assembly capable of retaining the bearing assembly within the bowl assembly. The bowl assembly may further comprise an annular wall section having an upper end and a lower end, an interior bowl space, and a an exit port located on the annular wall, and a lateral conduit having an interior annular space, the conduit being attached to the annular wall section over the exit port to permit fluid communication between the interior bowl space and the lateral conduit interior annular space.

In one embodiment, the rotatable bearing assembly comprises: (a) an inner annular barrel having a top end, a bottom end, an outer surface, an inner surface, a top wear ring having a first length mounted in the barrel outer surface proximate the top end, and a bottom wear ring having a second length mounted in the barrel outer surface proximate the bottom end, (b) an annular stripper rubber attached to the bottom end of the inner barrel in axial relationship therewith, and (c) a bearing seal assembly mounted in sealed, rotating relationship about the outer surface of the inner barrel.

In one embodiment, the bearing seal assembly further comprises (i) an outer annular barrel having a top end, a bottom end, an inner surface and an outer surface, (ii) a top seal plate, (ii) a bottom seal plate, (iii) an annular space defined by the top seal plate, bottom seal plate, outer barrel inner surface and the inner barrel outer surface, (iv) bearings located within a central section of the annular space, the central section further comprising a bearing lower annular space, bearing upper annular space and a bearing central annular space therebetween, (v) a bottom seal housing located along the length of the bottom wear ring within the annular space.

The bottom seal housing further comprises: a bottom seal housing annular space for containing a bottom seal housing sleeve, one or more lower rotary seals oriented in a direction to prevent influx of wellbore pressure, and an upper rotary seal oriented in an opposite direction of the one or more lower rotary seals; the sleeve further comprising an upper sleeve end, a lower sleeve end, an outer surface, an inner surface, a first recess in the lower sleeve end for housing the one or more lower rotary seals in the annular space in sealed relationship between the lower wear ring and across the bottom seal housing annular space, the upper rotary seal being retained across the bearing lower annular space by the upper sleeve end and a first spacer ring therebetween; an annular space between the first spacer ring and the bottom wear ring; a sleeve annular space between the sleeve inner surface, the bottom wear ring, the lower rotary seal and the upper rotary seal, and a bottom seal inner annular space between an upper edge of the upper rotary seal in fluid communication with the bearing lower annular space, a first, annular housing oil channel in the housing, a first annular sleeve oil channel in the sleeve, one or more oil channels interconnecting the sleeve oil channel and the housing oil channel in fluid communication, and one or more oil channels interconnecting the sleeve oil channel and the sleeve annular space in fluid communication.

The bearing seal housing further comprises a top seal housing is also provided located along the length of the top wear ring within the annular space and comprising: a top seal housing annular space for containing one or more upper rotary seals, the housing annular space being defined by a lower lip, the upper wear ring, and the top seal housing, a top seal housing annular space between the lower lip and the upper wear ring in fluid communication with the bearing upper annular space, a second spacer ring separating the one or more upper rotary seals, an annular space between the second spacer ring and the upper wear ring, and a top seal inner annular space between an upper edge of the upper rotary seal in fluid communication with the atmosphere.

The bearing seal housing is also provided with an oil channel main conduit having a proximal end extending from the top end of the outer barrel to a distal end located proximate the bottom end of the outer barrel, the oil channel proximal end further comprising an oil hose coupler for receiving an oil line, and an oil channel lateral conduit in the outer barrel interconnecting the distal end of the main oil channel with the first, annular housing oil channel in the housing.

Also disclosed is an RCD bearing assembly as described above for use in various RCD systems.

Methods are disclosed using the RCDs and RCD bearing assemblies described herein.

One method is directed to cooling and lubricating the bearings and rotary seals in an RCD according to claim 1 comprising the steps of: (a) providing a source of oil in an oil reservoir in an oiler device, (b) interconnecting the oil reservoir in the oiler to the oil line coupler on the RCD, (c) pressurizing the oil reservoir with a source of compressed air, (d) pumping the oil from the oil reservoir through the oil line to the oil line coupler, (e) pumping the oil into the oil channel main conduit, through the oil channel lateral conduit, into the first annular housing oil channel in the housing, (f) pumping the oil from the first annular housing oil channel into the first annular sleeve oil channel via the one or more oil channels interconnecting the sleeve oil channel and the first annular housing oil channel, (g) pumping the oil from the first annular sleeve oil channel into the sleeve annular space via the one or more oil channels interconnecting the sleeve annular space and the sleeve oil channel, (h) permitting the oil to circulate in the sleeve annular space, (i) permitting the oil to circulate along the top of the one or more lower rotary seals in the lower housing, (j) permitting the oil to circulate past the upper rotary seals in the lower housing and into the bearing annular space, (k) permitting the oil to move through the bearing annular space to lubricate and cool the bearings, (l) permitting the oil to exit the bearing annular space into the upper housing annular space, and (m) permitting the oil to circulate past the rotary seals in the upper housing and to then exit out to atmosphere.

The method may further comprise the steps of monitoring the oil level in the oiler, monitoring the flow of the oil exiting the upper housing and making adjustments to the oil flow rate by adjusting the air pressure applied to the oiler.

DESCRIPTION OF THE INVENTION

Figure 1:
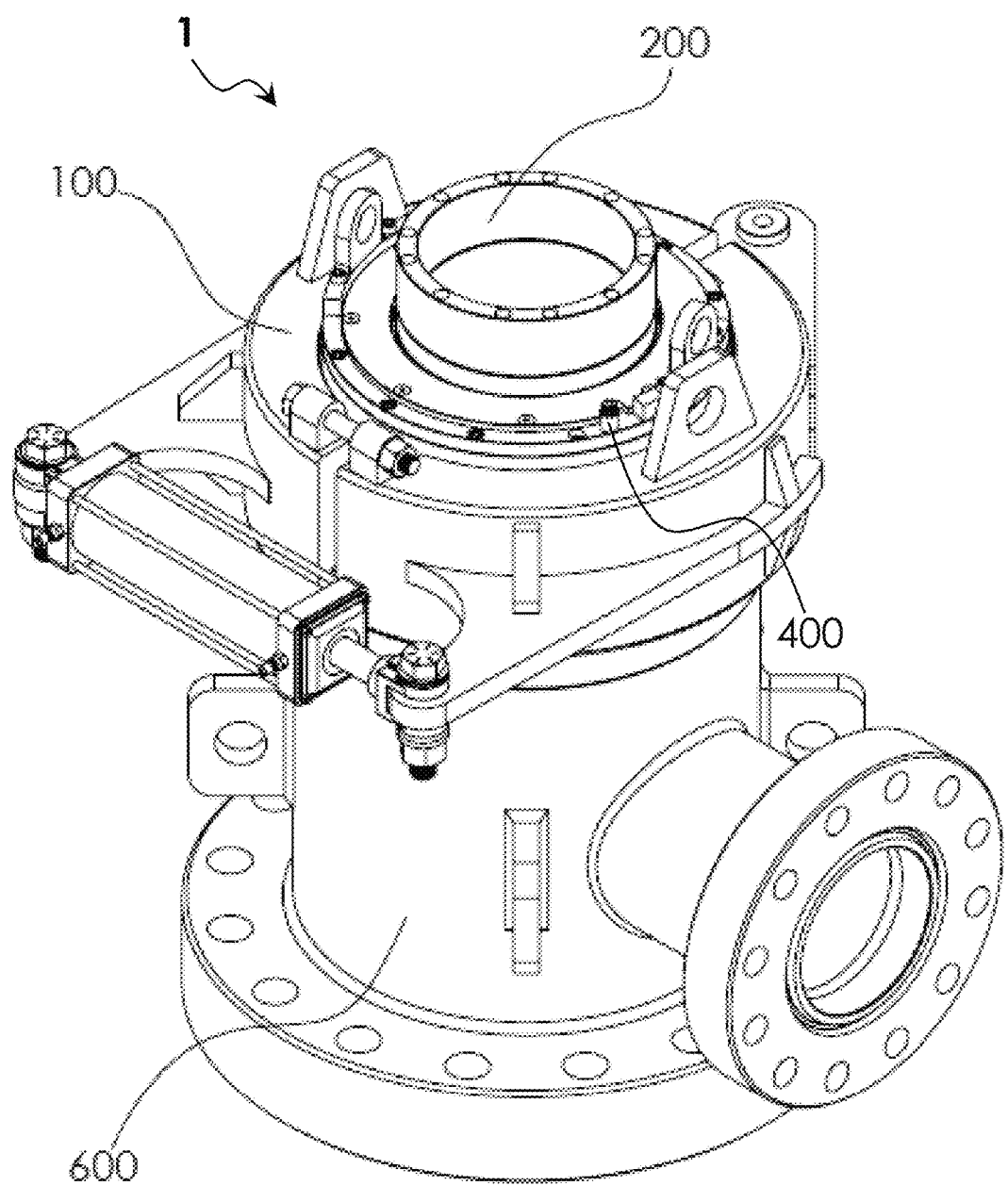
FIG. 1 is a perspective view of an embodiment of an RCD device according the present disclosure.
Figure 2:
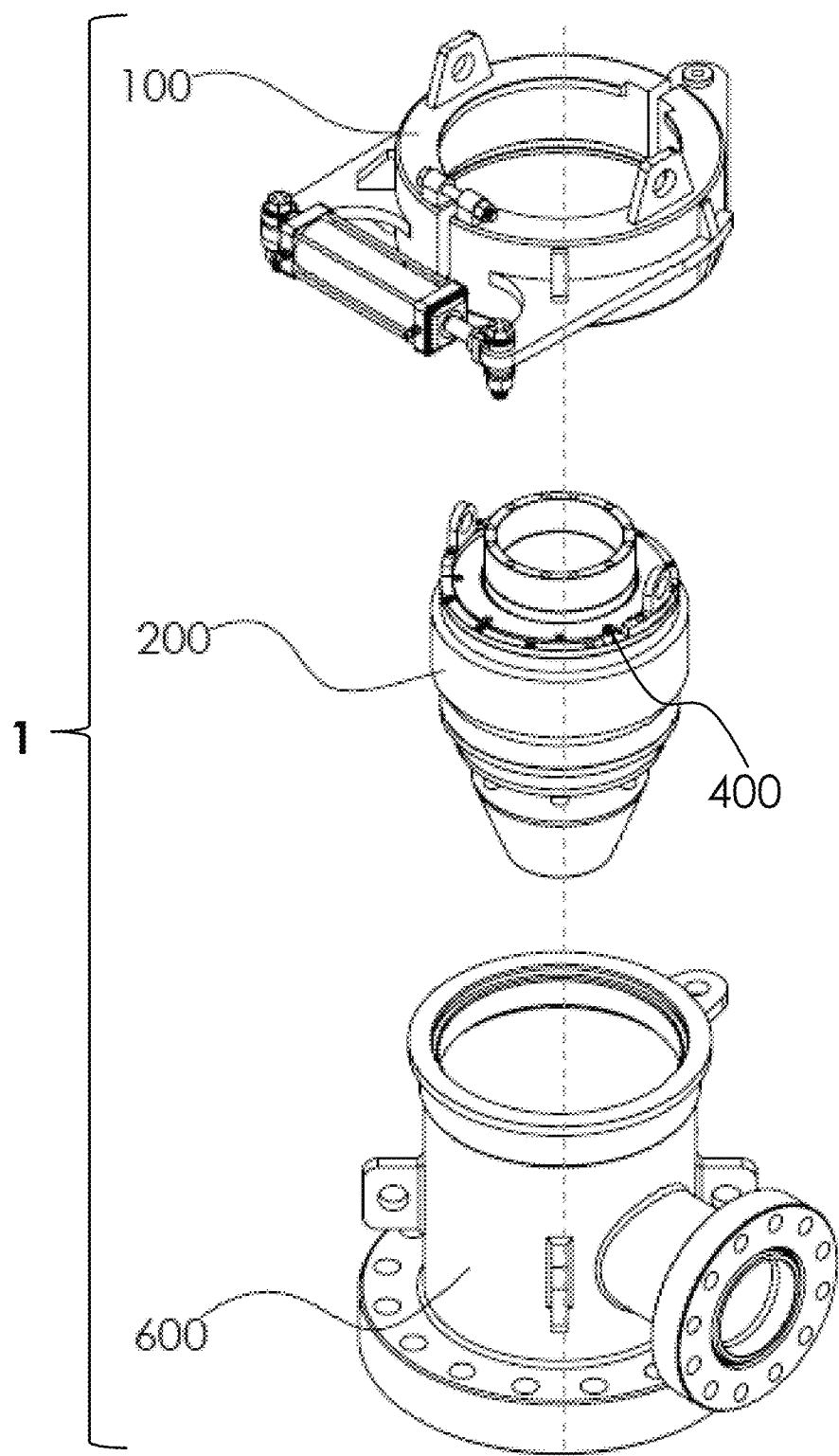
FIG. 2 depicts an exploded perspective view of the RCD device of FIG. 1 showing the bowl assembly, seal assembly and clamp assembly.
Figure 3:
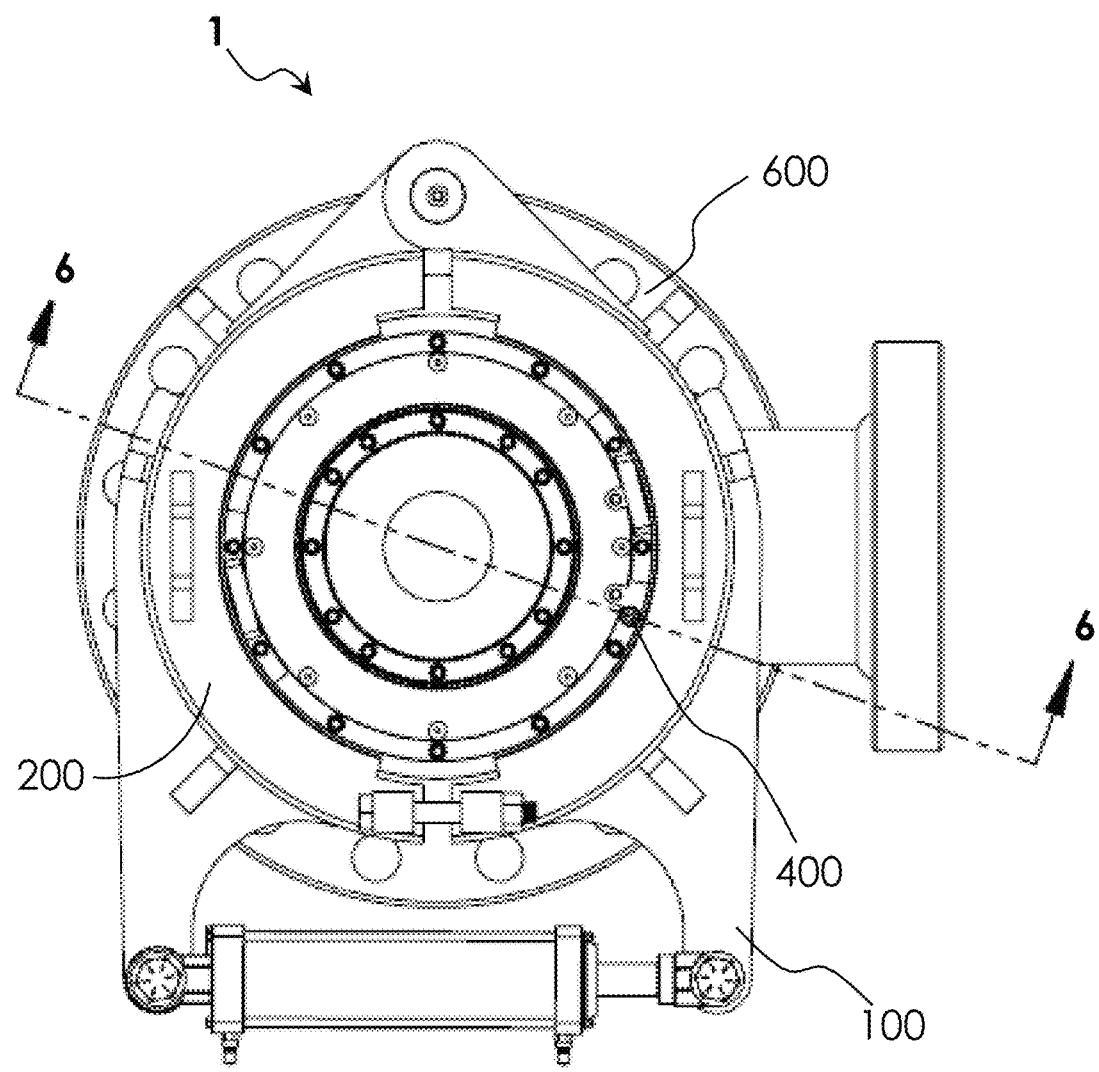
FIG. 3 depicts a top plan view of the RCD device of FIG. 1.
Figure 4:
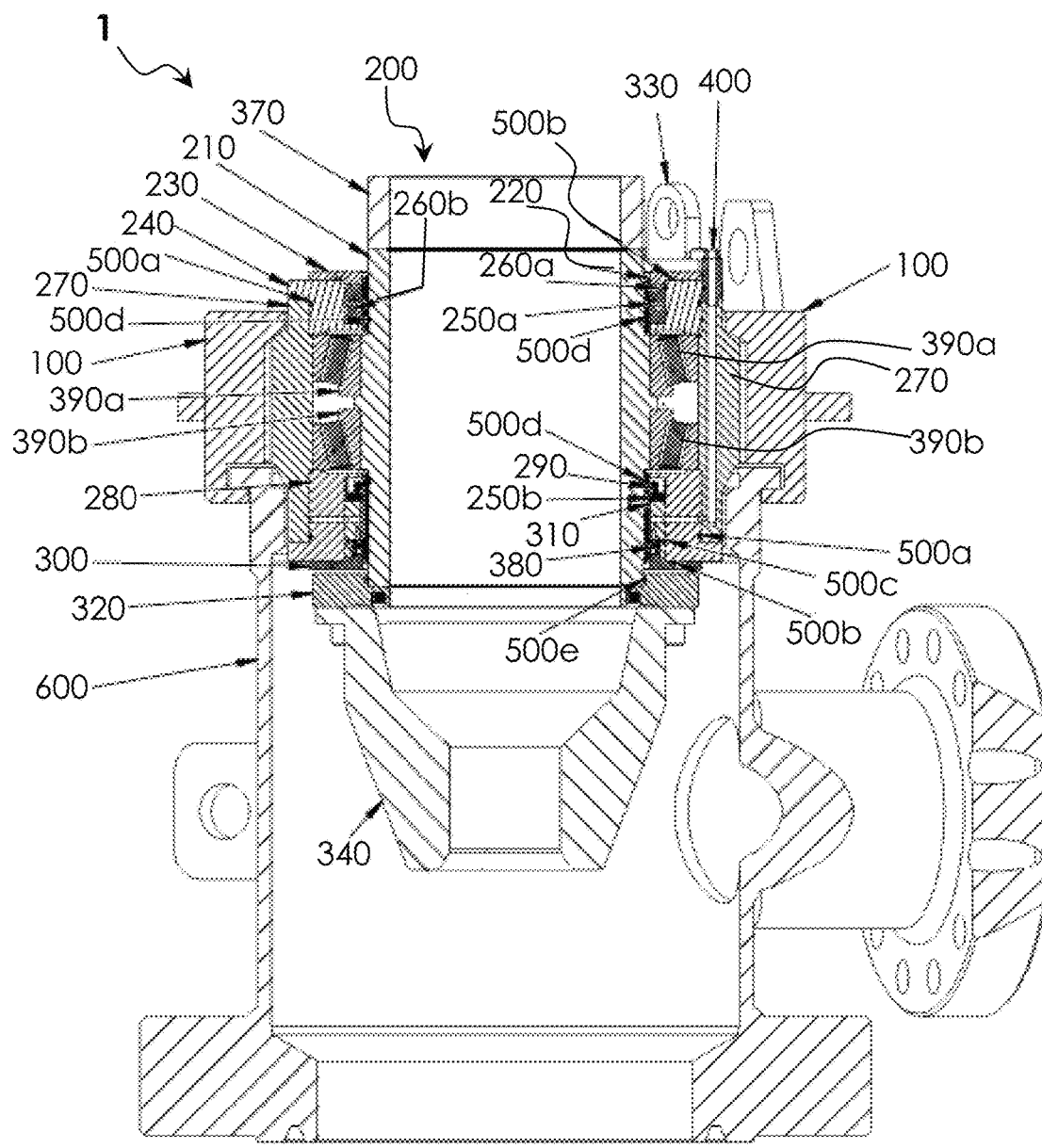
FIG. 4 depicts a cross sectional plan view of the RCD device of FIG. 1 taken along lines 6-6 of FIG. 3.
Figure 5:
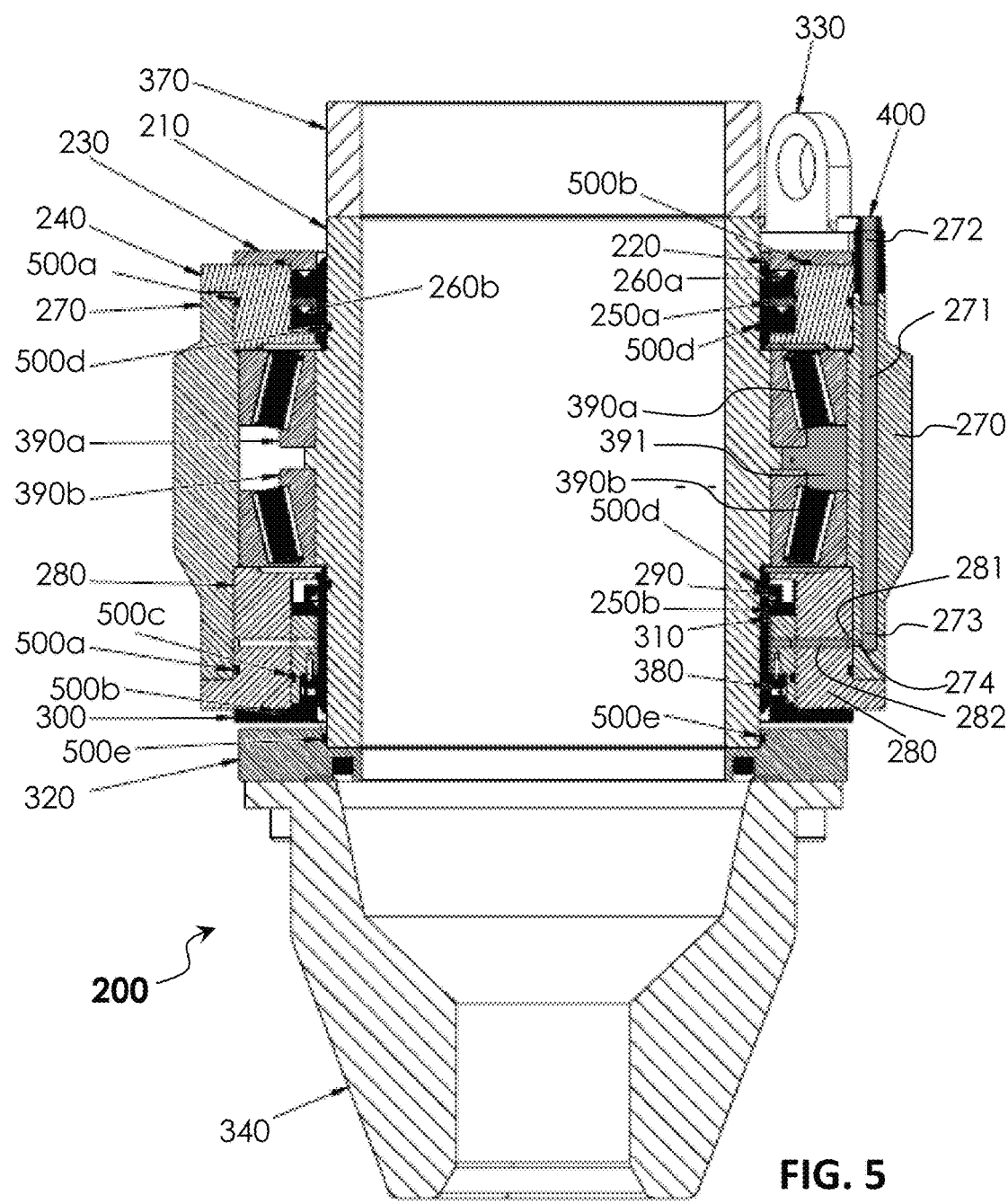
FIG. 5 depicts a cross sectional plan view of the RCD device seal assembly of FIG. 4.
Figure 6:
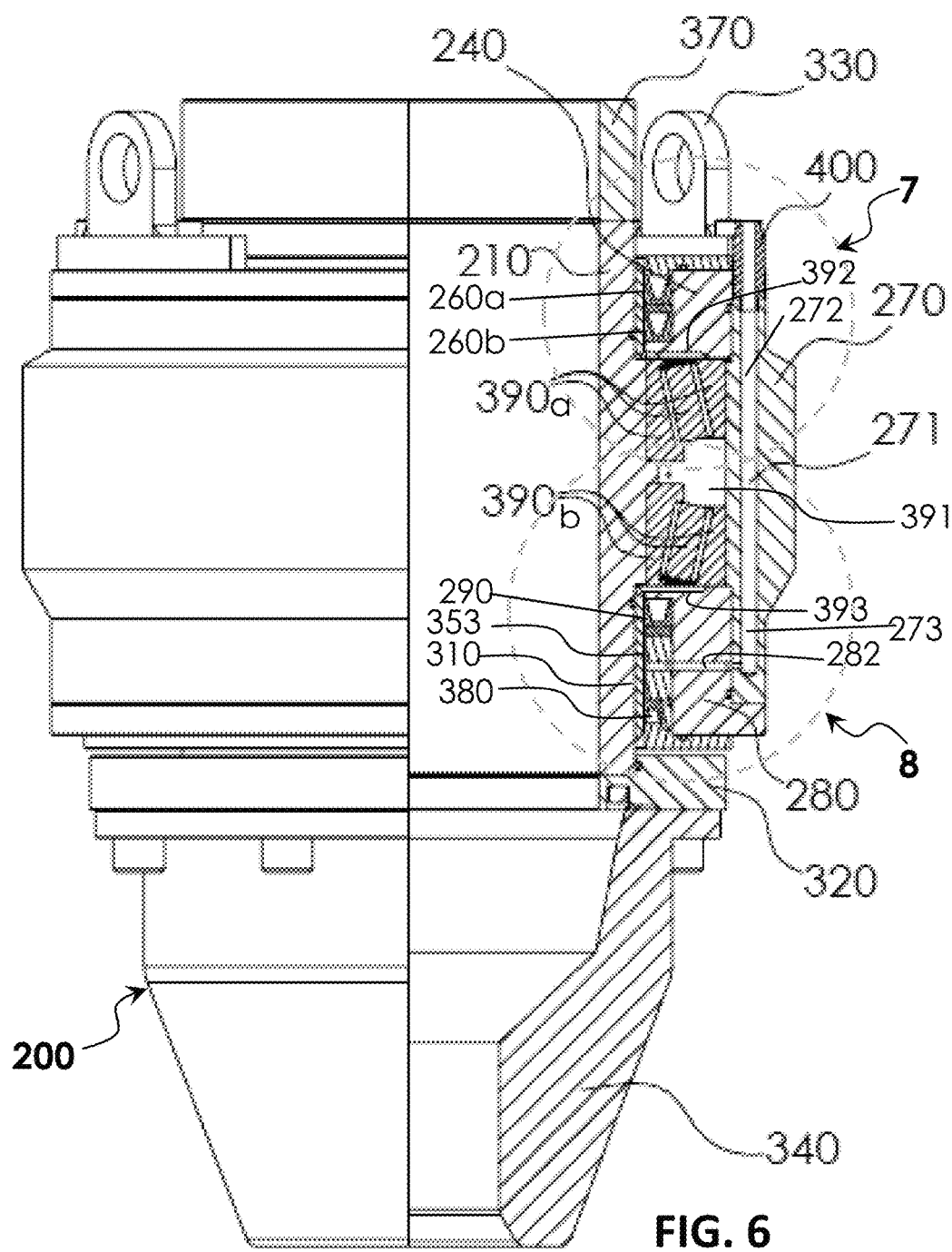
FIG. 6 depicts a quarter cross sectional plan view of the RCD device seal assembly of FIG. 4.
Figure 7:
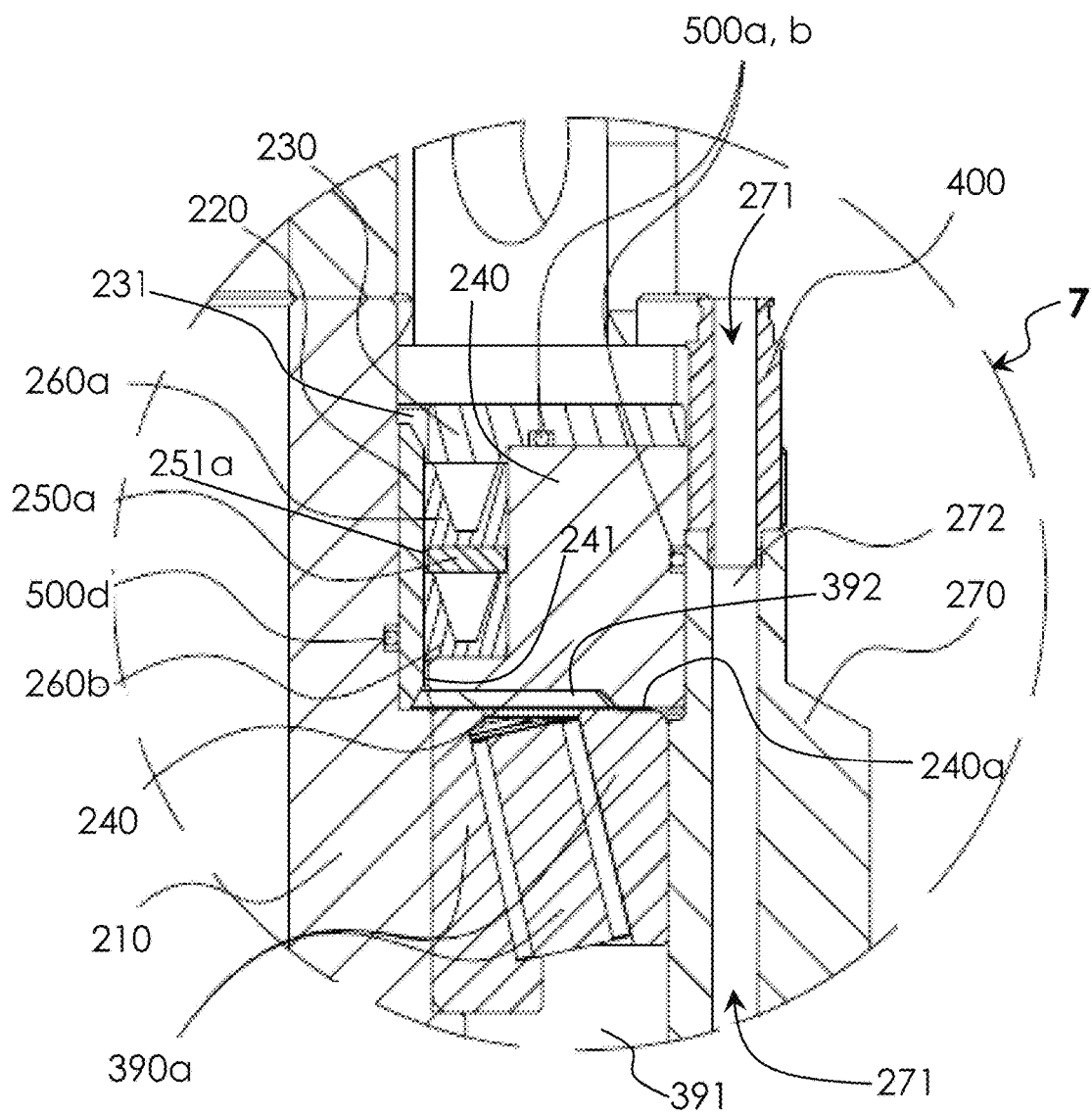
FIG. 7 illustrates an enlargement of upper section 7 of FIG. 6.
Figure 8:
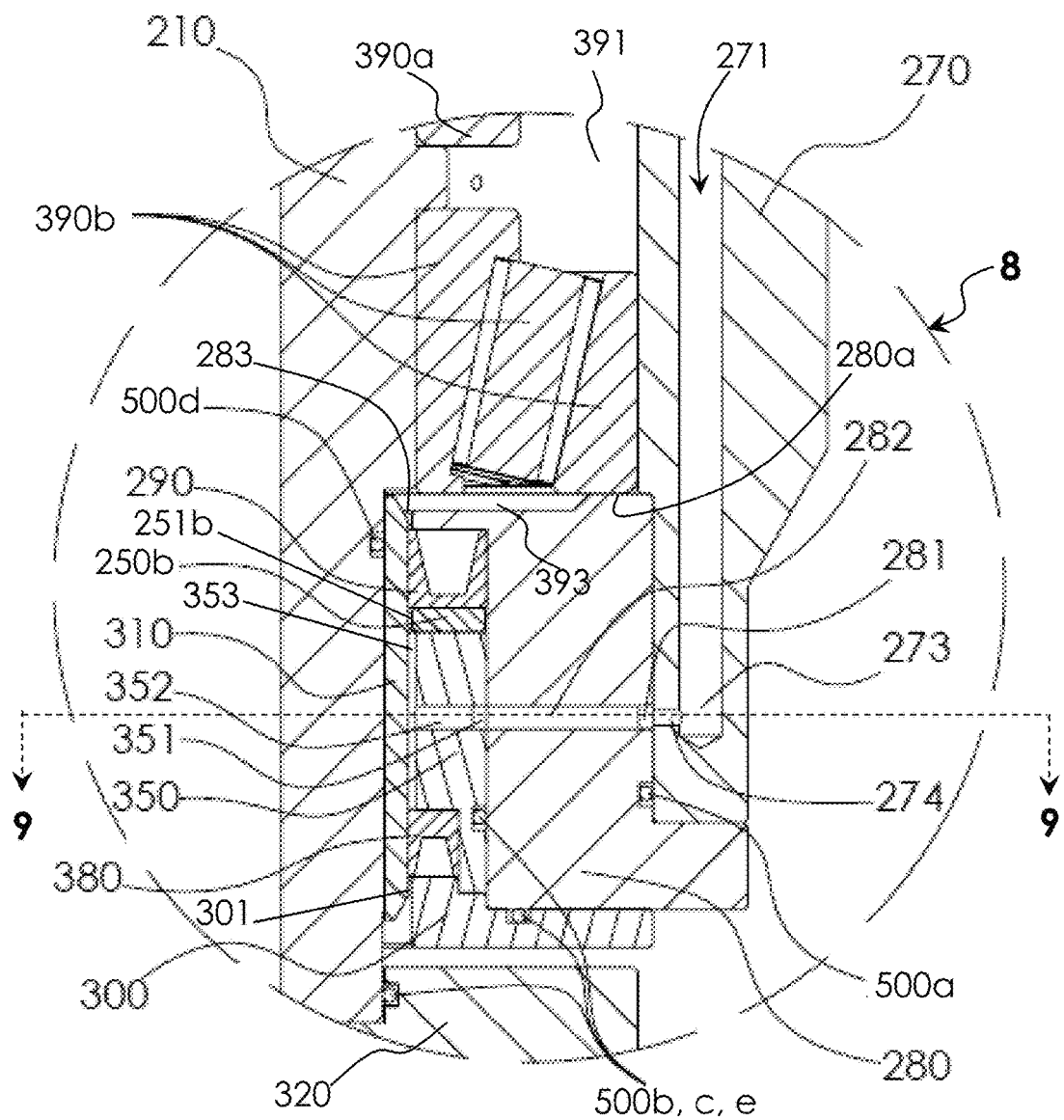
FIG. 8 illustrates an enlargement of lower section 8 of FIG. 6.

The present disclosure pertains to an improved RCD device 1. Referring to FIGS. 1-4 there is shown an exemplary RCD 1 generally comprising three basic components: (1) a rotatable bearing assembly 200 comprising roller bearings 390a, 390b, (2) a flanged adapter bowl 600 for receiving the bearing assembly 200, and (3) a clamp assembly 100 for containing the bearing assembly within the flanged adapter bowl 600 in a sealed, but rotatable fashion. The clamp assemblies 100 are typically hydraulic, and may be manually or remotely controlled.

The present invention is directed to an improved and simplified method and system for lubricating the bearings 390a, 390b and cooling the rotary seals, e.g., 260a, 260b, 290, 380 of an RCD 1 . The present invention more specifically is directed to an improved bearing assembly 200 used in such RCDs. As will be understood from those of ordinary skill in the art having the benefit of the present disclosure, these improvements can be incorporated into any RCD device, particularly the intermediate pressure style RCDs, and reference to the RCD 1 shown in the drawings is illustrative of one such embodiment.

Referring also to FIGS. 4-9, details of the improved bearing assembly 200 are set forth. The bearing assembly 200 comprises an annular topdrive kelly drive section 370 connected to the inner annular barrel 210 and an outer annular barrel section 270. The inner barrel 210 resides coaxially within the outer barrel 270, the inner barrel having an outer diameter less than the inner diameter of the outer barrel to create an internal annular space 391 therebetween. The bearing assembly also comprises a top seal housing 240 and a bottom seal housing 280 opposite thereto. The outer face of the top seal housing 240 is attached to the inner face of the top end of the outer barrel and employs an o-ring seal 500a therebetween. The outer face of the bottom seal housing 280 is attached to the inner face of the lower end of the outer barrel and employs an o-ring seal 500a therebetween. Housed within the annular space 391 between top and bottom seal housings 240, 280 (and top and bottom seal housing shoulders 240a, 280a) are the bearings 390a, 390b.

Bottom seal plate 300 and top seal plate 230 create the lower and upper boundaries of the annular space 391 between the inner and outer barrels. In this embodiment the upper seal plate 230 has an annular groove in its inner face for receiving an o-ring (e.g., 500b) to create a seal between the inner face of top seal plate 230 and the outer face of the top seal housing 240. Similarly, the lower seal plate 300 has an annular groove in its inner face for receiving an o-ring (e.g., 500a) to create a seal between the inner face of bottom seal plate 300 and the outer face of the bottom seal housing 280.

Referring now to the bottom seal section (highlighted in FIG. 8), the bottom seal housing 280 has an outer diameter attached to the outer barrel 270 and employs an o-ring seal therebetween. The top of the bottom seal housing has an extended lip facing radially inwardly. At the lower end of the inner barrel there is provided a bottom wear ring 310. The space between the bottom wear ring 310, the inner surface of the bottom seal housing 280 and the underside of the bottom housing extended lip create a bottom seal annular space 353 having an upper end and a lower end proximate the bottom seal plate 300. There is a small gap 283 between the edge of the lip and the edge of the wear plate 310. An annular o-ring seal 500d is located within an annular groove in the inner barrel 210 to serve as a seal between the inner barrel and the top of the bottom wear ring 310.

Housed within this bottom seal annular space 353 is a bottom seal housing sleeve 350 having an outer face adjacent to the bottom seal housing inner face (with an o-ring seal 500c employed therebetween). The inner diameter of the bottom seal housing sleeve remains slightly spaced apart from the outer surface of the wear ring 310 to permit annular flow of oil in the annular space 353. The lowermost portion of the bottom seal housing sleeve has an annular notch for receiving a first rotary seal 380. As will be seen, this rotary seal 380 is oriented with its grooved face facing downward where it meets potential annular pressure that comes through bottom seal place gap 301. The upper end of the bottom seal housing sleeve serves to hold in place a first seal spacer ring 250b and a rotary seal 290 between the upper end of the bottom seal housing sleeve and the underside lip of the bottom seal housing 280. The inner diameter of the first seal spacer ring 250b is designed to permit a small annular gap 251b to remain to permit the annular flow of oil therethrough. The rotary seal 290 is oriented in the upward position to permit oil from annular space 353 to flow past the seal 290 and through the gap 283 into the bearing lower annular space 393.

The bottom housing sleeve outer surface also contains an annular grooved channel 351. One or more intersecting oil channels 352 interconnect the annular channel 351 and the vertical annular space 353 to permit fluid communication (and the flow of oil) therethrough.

Figure 9:
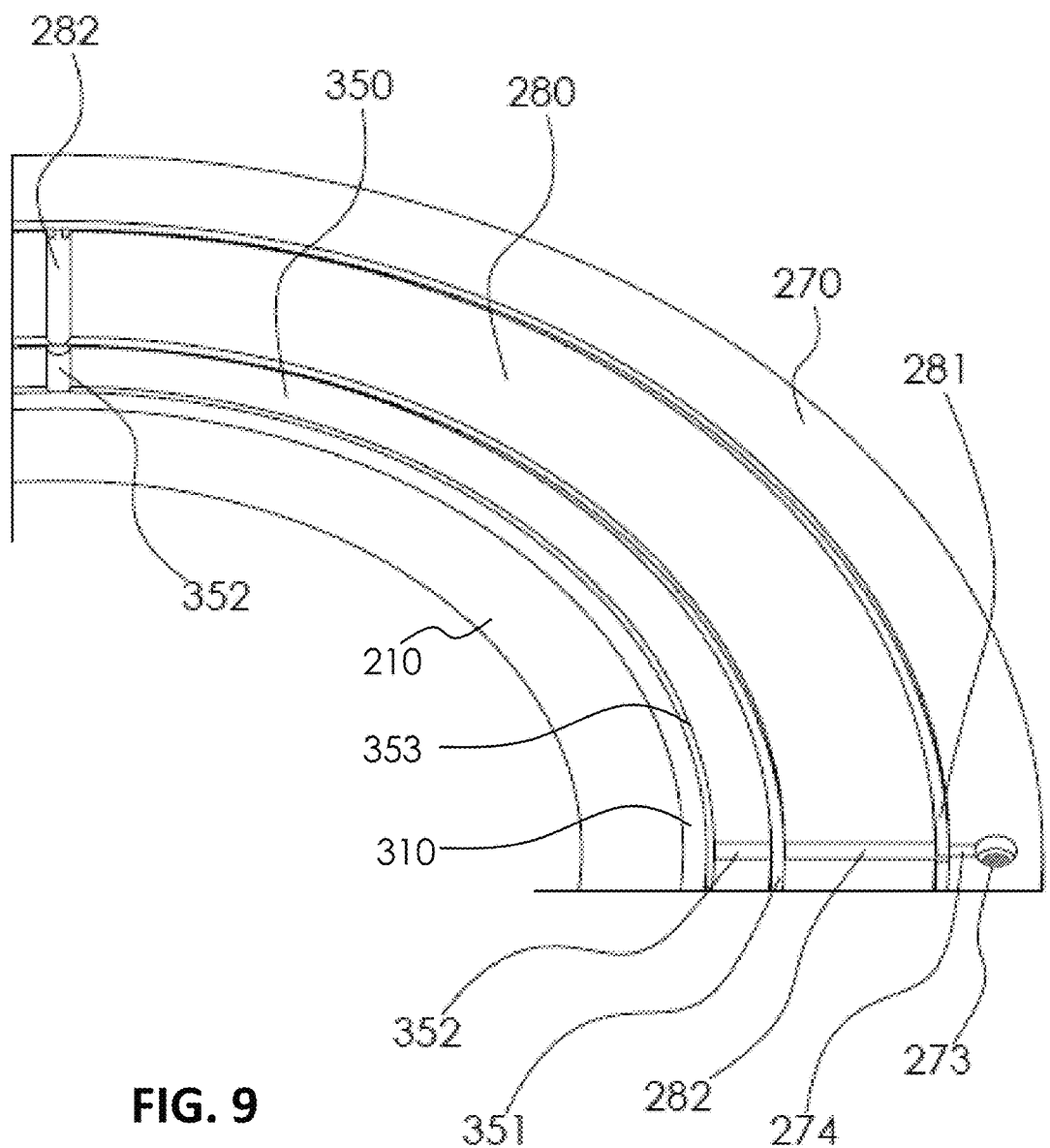
FIG. 9 represents a partial cross sectional view taken across lines 9-9 of FIG. 8.

The bottom seal housing 280 also comprises an outer annular grooved channel 281 on its outer surface adjacent to the inner surface of the outer barrel. One or more intersecting oil channels 282 interconnect the bottom seal housing annular channel 281 and the bottom housing sleeve annular channel 351 to permit fluid communication (and the flow of oil) therethrough. As depicted in FIG. 9, in one embodiment, there exist four channels 282 equally spaced apart from each other, and there exist four channels 352 spaced equally apart from each other. Other variations on the number and location of the channels exist. Additionally, as shown in FIG. 9, channels 282 and 352 are aligned along the same axis. However, this is not a requirement.

Referring now to the top seal section (highlighted in FIG. 7), the top seal housing 240 has an outer diameter attached to the outer barrel 270 and employs an o-ring seal 500a therebetween. The bottom of the top seal housing has an extended lip facing radially inwardly. At the upper end of the inner barrel 210 there is provided a top wear ring 220. The space between the top wear ring 220, the inner surface of the top seal housing 240 and the underside of the top housing extended lip create a top seal annular space. There is a small gap 241 or annular space between the edge of the lip and the edge of the wear plate 310. An annular o-ring seal 500d is located within an annular groove in the inner barrel 210 to serve as a seal between the inner barrel and the lower end of the top wear ring 220. Housed within this top seal annular space are two rotary seals 260a, 260b separated by a second seal spacer ring 250a. The inner diameter of the second seal spacer ring 250a is designed to permit a small annular gap 251a to remain to permit the annular flow of oil therethrough. As such, the desired number of rotary seals can be positioned in this annular space between the underside of the top seal plate 230 and the upper housing 240 lip. The rotary seals 260a, 260b are oriented in the upward position to permit oil from annular space 251a to flow past the seals and through the gap 231 external to the bearing assembly where it can be collected.

The bearing assembly of the present disclosure is further outfitted with an oil cooling and lubricating system. Oil from an oiler unit (not shown) is introduced via oil hose coupler 400 into a channel conduit 271 located within the wall of the outer barrel 270 of the bearing assembly 200. The coupler 400 is preferably located on the upper end of the outer barrel 270. This channel conduit 271 is depicted here as being a generally longitudinal boring within the wall of the outer barrel 270, and comprises upper end 272 and lower end 273.

Channel conduit 274 provides fluid communication between lower portion 273 of vertical oil port 271 and annular channel 281.

The purpose of channel conduit 274 is to provide a pathway for oil to be directed from the lower end 273 of oil conduit 271, into annular channel 281, then from annular channel 281 to annular channel 351 (via one or more of the channels 282), then from annular channel 351 into vertical annular space 353. Once into the vertical annular space 353 the oil can circulate downwardly toward the top of the rotary seal 380 to provide cooling and lubrication of that seal. If the wellbore is operationally at a higher pressure than the pressure of the oiler unit pump (i.e., the oiler unit provides the oil typically at pressures of about 25-50 psi), then the oil will not be permitted past the rotary seal 380. In operation, the pressure required for the oiler is calculated based on the pressure required to permit the oil to weep across the seal geometry. As such, where the seal material creates a stronger seal, it may be required to increase the oil pressure. In one embodiment, the oiler provides oil at about 35 psi. However, when the wellbore pressure is less than 35 psi, then some of the circulating oil will be permitted to pass or seep across the rotary seal 380 to provide additional cooling and lubrication of that seal. As the fresh oil enters annular space 353 it provides constant cooling and lubrication of this lower rotary seal 380.

Additionally, as the oil enters annular space 353, it will also preferentially circulate upwardly, through seal spacer inner annular space 251b, past rotary seal 290 (which is oriented upwardly in the opposite fashion as rotary seal 380) and then proceed out of the bottom seal housing 280 via bottom seal housing inner annular space 283. The circulating oil having now also cooled and lubricated the rotary seal 290, then enters the bearing lower annular space 393 where it can then proceed into the bearing central annular space 391 to provide cooling and lubrication for the bearings 390a, 390b.

The circulating oil then enters into the bearing upper annular space 392, and is permitted to proceed into the top seal housing 240 via the top seal housing inner annular space 241. Once in the top seal housing annular space, the oil proceeds past rotary seal 260b (which is oriented in upward position in an opposite fashion as rotary seal 380), past the second seal spacer ring 250a (via annular space 251a) and then past rotary seal 260a (which is also oriented in upward position in an opposite fashion as rotary seal 380). The circulating oil, having also cooled and lubricated rotary seals 260b and 260a, then proceeds out of the bearing assembly via top seal plate inner annular space 231.

As will be understood by those having the benefit of the present disclosure, other seal configurations, e.g., double or triple stacks of seals, can be employed in like fashion.

The bearing assembly typically 200 employs one or more bearing assembly lifting eye 330 attached to the top surface.

A rubber adapter 320 is located at the bottom of the bearing assembly 200. An o-ring 500e seal is also placed between the interface of the rubber adapter 320 inner face and the outer face of the inner barrel 210. Stripper rubber 340 is mounted to the lower edge of the adapter 320.

In one embodiment, this invention may be is installed in an intermediate pressure rotating head device. Intermediate pressure is typically referred to the operational conditions of 1500 psi static and 1000 psi rotating pressure being required. The invention uses an oiling system that cools the seals and lubricates the rotatory bearings at the same time without requiring a sophisticated cooling and oiling unit that other high-pressure rotating heads require.

The oiler system may comprise a 30-50 gallon reservoir. In one embodiment, the oiler tank (not shown) is a small reservoir (approximately 35 gallons) containing oil that is pumped (using regulated air pressure provided by the rig) at a desired pressure (approximately 30-35 psi in one embodiment) through an oil line (not shown) to the coupler 400 of the RCD 1. The oiler can be designed with a very small footprint to minimize rig floor space. In one embodiment, the oiler is cylindrical with a height of 36-42 inches. The oil line is connected at the top of the RCD assembly (to coupler 400) where the oil is pumped down through the outer barrel to the bottom of the bearing assembly 200. Then the oil is pumped through a bottom housing and into a seal sleeve. The oil then floods the seal sleeve with fresh clean oil which cools the high pressure seal as well as lubricates it. The oil then goes through another seal that is facing up and goes directly into the interior of the assembly. This lubricates the bearing and keeps them cool. The oil is pushed out through the top of the assembly after passing over two more seals also facing up. This allows the oil the seep out at a low rate allowing the heat to be dissipated and to maintain the bearing assemblies with constant fresh oil while keeping them cool at the same time.

This RCD device, with the modified oil cooling system as described herein, provides benefits over the prior art. All other intermediate and high pressure rotating heads require large bulky power units with large tanks for oil and cooling fluids. These units have to be hooked into rig electrical power which is set up on the ground with at least 3 hoses or more going up through the sub structure to the assembly requiring extra rig up time and space.

The modified RCD bearing assembly described herein only requires 1 oiler tank and one hose to accomplish the same task as other high pressure rotating heads thus requiring minimal rig up time and space.

All references referred to herein are incorporated herein by reference. While the apparatus, systems and methods of this invention have been described in terms of preferred or illustrative embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art.

I claim:

1. A rotating control device (RCD) comprising:
a rotatable bearing assembly comprising
   (a) an inner annular barrel having a top end, a bottom end, an outer surface, an inner surface, a top wear ring having a first length mounted in the barrel outer surface proximate the top end, and a bottom wear ring having a second length mounted in the barrel outer surface proximate the bottom end,
   (b) an annular stripper rubber attached to the bottom end of the inner barrel in axial relationship therewith, and
   (c) a bearing seal assembly mounted in sealed, rotating relationship about the outer surface of the inner barrel, the bearing seal assembly further comprising
      i. an outer annular barrel having a top end, a bottom end, an inner surface and an outer surface,
      ii. a top seal plate,
      iii. a bottom seal plate,
      iv. an annular space defined by the top seal plate, bottom seal plate, outer barrel inner surface and the inner barrel outer surface,
      v. bearings located within a central section of the annular space, the central section further comprising a bearing lower annular space, bearing upper annular space and a bearing central annular space therebetween,
      vi. a bottom seal housing located along the length of the bottom wear ring within the annular space comprising
         a bottom seal housing annular space for containing a bottom seal housing sleeve, one or more lower rotary seals oriented in a direction to prevent influx of wellbore pressure, and an upper rotary seal oriented in an opposite direction of the one or more lower rotary seals,
         the sleeve further comprising an upper sleeve end, a lower sleeve end, an outer surface, an inner surface, a first recess in the lower sleeve end for housing the one or more lower rotary seals in the annular space in sealed relationship between the lower wear ring and across the bottom seal housing annular space, the upper rotary seal being retained across the bearing lower annular space by the upper sleeve end and a first spacer ring therebetween,
         an annular space between the first spacer ring and the bottom wear ring,
         a sleeve annular space between the sleeve inner surface, the bottom wear ring, the lower rotary seal and the upper rotary seal, and
         a bottom seal inner annular space between an upper edge of the upper rotary seal in fluid communication with the bearing lower annular space,
         a first, annular housing oil channel in the housing,
         a first annular sleeve oil channel in the sleeve,
         one or more oil channels interconnecting the sleeve oil channel and the housing oil channel in fluid communication,
         one or more oil channels interconnecting the sleeve oil channel and the sleeve annular space in fluid communication,
      vii. a top seal housing located along the length of the top wear ring within the annular space comprising
         a top seal housing annular space for containing one or more upper rotary seals, the housing annular space being defined by a lower lip, the upper wear ring, and the top seal housing,
         a top seal housing annular space between the lower lip and the upper wear ring in fluid communication with the bearing upper annular space,
         a second spacer ring separating the one or more upper rotary seals,
         an annular space between the second spacer ring and the upper wear ring, and
         a top seal inner annular space between an upper edge of the upper rotary seal in fluid communication with the atmosphere,
      viii. an oil channel main conduit having a proximal end extending from the top end of the outer barrel to a distal end located proximate the bottom end of the outer barrel, the oil channel proximal end further comprising an oil hose coupler for receiving an oil line, and
ix. an oil channel lateral conduit in the outer barrel interconnecting the distal end of the main oil channel with the first, annular housing oil channel in the housing, a flanged adapter bowl assembly for receiving the bearing assembly, the bowl assembly further comprising
  (a) an annular wall section having an upper end and a lower end, an interior bowl space, and an exit port located on the annular wall,
  (b) a lateral conduit having an interior annular space, the conduit being attached to the annular wall section over the exit port to permit fluid communication between the interior bowl space and the lateral conduit interior annular space,
and,
a clamp assembly capable of retaining the bearing assembly within the bowl assembly.

2. A method for cooling and lubricating the bearings and rotary seals in an RCD according to claim 1 comprising the steps of:
(a) providing a source of oil in an oil reservoir in an oiler device,
(b) interconnecting the oil reservoir in the oiler to the oil line coupler on the RCD,
(c) pressurizing the oil reservoir with a source of compressed air,
(d) pumping the oil from the oil reservoir through the oil line to the oil line coupler,
(e) pumping the oil into the oil channel main conduit, through the oil channel lateral conduit, into the first annular housing oil channel in the housing,
(f) pumping the oil from the first annular housing oil channel into the first annular sleeve oil channel via the one or more oil channels interconnecting the sleeve oil channel and the first annular housing oil channel,
(g) pumping the oil from the first annular sleeve oil channel into the sleeve annular space via the one or more oil channels interconnecting the sleeve annular space and the sleeve oil channel,
(h) permitting the oil to circulate in the sleeve annular space,
(i) permitting the oil to circulate along the top of the one or more lower rotary seals in the lower housing,
(j) permitting the oil to circulate past the upper rotary seals in the lower housing and into the bearing annular space,
(k) permitting the oil to move through the bearing annular space to lubricate and cool the bearings,
(l) permitting the oil to exit the bearing annular space into the upper housing annular space, and
(m) permitting the oil to circulate past the rotary seals in the upper housing and to then exit out to atmosphere.

3. The method of claim 2 further comprising the steps of monitoring the oil level in the oiler, monitoring the flow of the oil exiting the upper housing and making adjustments to the oil flow rate by adjusting the air pressure applied to the oiler.

4. A rotating control device (RCD) bearing assembly comprising:
a. an inner annular barrel having a top end, a bottom end, an outer surface, an inner surface, a top wear ring having a first length mounted in the barrel outer surface proximate the top end, and a bottom wear ring having a second length mounted in the barrel outer surface proximate the bottom end,
b. an annular stripper rubber attached to the bottom end of the inner barrel in axial relationship therewith,
c. a bearing seal assembly mounted in sealed, rotating relationship about the outer surface of the inner barrel, the bearing seal assembly further comprising
  i. an outer annular barrel having a top end, a bottom end, an inner surface and an outer surface,
  ii. a top seal plate,
  iii. a bottom seal plate,
  iv. an annular space defined by the top seal plate, bottom seal plate, outer barrel inner surface and the inner barrel outer surface, and
  v. bearings located within a central section of the annular space, the central section further comprising a bearing lower annular space, bearing upper annular space and a bearing central annular space therebetween,
d. a bottom seal housing located along the length of the bottom wear ring within the annular space comprising
  i. a bottom seal housing annular space for containing a bottom seal housing sleeve, one or more lower rotary seals oriented in a direction to prevent influx of wellbore pressure, and an upper rotary seal oriented in an opposite direction of the one or more lower rotary seals,
  ii. the sleeve further comprising an upper sleeve end, a lower sleeve end, an outer surface, an inner surface, a first recess in the lower sleeve end for housing the one or more lower rotary seals in the annular space in sealed relationship between the lower wear ring and across the bottom seal housing annular space, the upper rotary seal being retained across the bearing lower annular space by the upper sleeve end and a first spacer ring therebetween,
  iii. an annular space between the first spacer ring and the bottom wear ring,
  iv. a sleeve annular space between the sleeve inner surface, the bottom wear ring, the lower rotary seal and the upper rotary seal, and
  v. a bottom seal inner annular space between an upper edge of the upper rotary seal in fluid communication with the bearing lower annular space,
  vi. a first, annular housing oil channel in the housing,
  vii. a first annular sleeve oil channel in the sleeve,
  viii. one or more oil channels interconnecting the sleeve oil channel and the housing oil channel in fluid communication, and
  ix. one or more oil channels interconnecting the sleeve oil channel and the sleeve annular space in fluid communication,
e. a top seal housing located along the length of the top wear ring within the annular space comprising
  i. a top seal housing annular space for containing one or more upper rotary seals, the housing annular space being defined by a lower lip, the upper wear ring, and the top seal housing,
  ii. a top seal housing annular space between the lower lip and the upper wear ring in fluid communication with the bearing upper annular space,
  iii. a second spacer ring separating the one or more upper rotary seals,
  iv. an annular space between the second spacer ring and the upper wear ring, and v. a top seal inner annular space between an upper edge of the upper rotary seal in fluid communication with the atmosphere,
f. an oil channel main conduit having a proximal end extending from the top end of the outer barrel to a distal end located proximate the bottom end of the outer barrel, the oil channel proximal end further comprising an oil hose coupler for receiving an oil line, and
g. an oil channel lateral conduit in the outer barrel interconnecting the distal end of the main oil channel with the first, annular housing oil channel in the housing.

* * * * *